(12) United States Patent
Boutayeb et al.

(10) Patent No.: US 11,515,653 B2
(45) Date of Patent: *Nov. 29, 2022

(54) SWITCHABLE LENS ANTENNA WITH INTEGRATED FREQUENCY SELECTIVE STRUCTURE

(71) Applicant: HUAWEI TECHNOLOGIES CO., LTD., Guangdong (CN)

(72) Inventors: Halim Boutayeb, Kanata (CA); Wenyao Zhai, Kanata (CA); Morris Repeta, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

This patent is subject to a terminal disclaimer.

(21) Appl. No.: 17/173,343

(22) Filed: Feb. 11, 2021

(65) Prior Publication Data
US 2021/0167522 A1 Jun. 3, 2021

Related U.S. Application Data

(63) Continuation of application No. 16/191,630, filed on Nov. 15, 2018, now Pat. No. 10,938,124.

(51) Int. Cl.
*H01Q 15/04* (2006.01)
*H01Q 25/00* (2006.01)
(Continued)

(52) U.S. Cl.
CPC ........... *H01Q 25/008* (2013.01); *G02B 27/09* (2013.01); *G02B 27/0955* (2013.01);
(Continued)

(58) Field of Classification Search
CPC ........ H01Q 25/008; H01Q 5/45; H01Q 13/02; H01Q 3/446; H01Q 15/04; H01Q 25/00; G02B 27/0955; G02B 27/09
(Continued)

(56) References Cited

U.S. PATENT DOCUMENTS 3,755,815 A  8/1973  Stangel et al.
6,396,440 B1  5/2002  Chen
(Continued)

FOREIGN PATENT DOCUMENTS

CN  108562876 A  9/2018
JP  2004364037 A  12/2004

OTHER PUBLICATIONS

Boutayeb Halim et al: "Beam Switching Dual Polarized Antenna Array With Reconfigurable Radial Waveguide Power Dividers", Apr. 2017, 8 pages.
(Continued)

*Primary Examiner* — Hai V Tran
(74) *Attorney, Agent, or Firm* — BCF LLP

(57) ABSTRACT

The disclosed structures and methods are directed to antenna systems configured to transmit and receive a wireless signal in and from different directions. A switchable lens antenna has excitation ports radiating radio-frequency (RF) wave into a parallel-plate waveguide structure, and a frequency selective structure (FSS). The antenna presented herein is configured to operate in two modes depending on an initial steering angle of the RF wave propagating in the parallel-plate waveguide structure. When the initial steering angle is about or less than a threshold steering angle, FSS is OFF due to its stubs being electrically disconnected from the parallel-plate waveguide structure. When the initial steering angle is higher than the threshold, FSS is ON with stubs being electrically connected to the parallel-plate waveguide structure. When ON, FSS provides phase variance to the RF wave propagating in the parallel-plate waveguide structure and increases steering angle of the RF wave.

17 Claims, 14 Drawing Sheets

(51) Int. Cl.
*H01Q 5/45* (2015.01)
*H01Q 13/02* (2006.01)
*G02B 27/09* (2006.01)
*H01Q 3/44* (2006.01)
*H01Q 15/00* (2006.01)
*H01Q 21/00* (2006.01)
*H01Q 3/24* (2006.01)

(52) U.S. Cl.
CPC ............. *H01Q 3/247* (2013.01); *H01Q 3/446* (2013.01); *H01Q 5/45* (2015.01); *H01Q 13/02* (2013.01); *H01Q 15/002* (2013.01); *H01Q 15/04* (2013.01); *H01Q 21/0012* (2013.01); *H01Q 21/0031* (2013.01); *H01Q 25/00* (2013.01)

(58) Field of Classification Search
USPC .......................................................... 343/753
See application file for complete search history.

(56) References Cited

U.S. PATENT DOCUMENTS

| | | | |
|---|---|---|---|
| 7,420,525 B2 | 9/2008 | Colburn et al. | |
| 7,898,480 B2* | 3/2011 | Ebling | H01Q 3/30 343/810 |
| 2014/0218237 A1 | 8/2014 | Boutayeb | |
| 2014/0266946 A1 | 9/2014 | Bily et al. | |
| 2015/0109178 A1 | 4/2015 | Hyde et al. | |
| 2015/0380814 A1 | 12/2015 | Boutayeb et al. | |
| 2015/0380815 A1* | 12/2015 | Boutayeb | H01Q 21/20 343/777 |
| 2016/0020526 A1 | 1/2016 | Evtyushkin et al. | |
| 2016/0156325 A1 | 6/2016 | Boutayeb et al. | |
| 2016/0218438 A1 | 7/2016 | Miraftab et al. | |

OTHER PUBLICATIONS

Klemes Marek et al: "Minimal-hardware 2-D steering of arbitrarily large circular arrays (combining axial patterns of phasemodes)", 2016, 8 pages.

Supplementary European Search Report; Issued by the EPO in connection with the corresponding application No. 19884544.8; dated Nov. 12, 2021.

Yang et al., 'Wide-Band E-Shaped Patch Antennas for Wireless Communications', IEEE Transactions on Antennas and Propagation, Jul. 2001, vol. 49, No. 7.

Bayraktar et al., 'Beam Switching Reflectarray Monolithically Integrated With RF MEMS Switches', IEEE Transactions on Antennas and Propagation, Feb. 2012, vol. 60, No. 2.

Hans Steyskal et al., 'On the Gain-versus-Scan Trade-offs and the Phase Gradient Synthesis for a Cylindrical Dome Antenna', IEEE Transactions on Antennas and Propagation, vol. AP-27, No. 6, Nov. 1979, pp. 825-831.

* cited by examiner

SWITCHABLE LENS ANTENNA WITH INTEGRATED FREQUENCY SELECTIVE STRUCTURE

CROSS-REFERENCE TO RELATED APPLICATIONS

The present application is a Continuation of U.S. patent application Ser. No. 16/191,630, filed on Nov. 15, 2018, the disclosure of which is incorporated by reference herein in its entirety.

FIELD OF THE INVENTION

The present invention generally relates to the field of wireless communications and, in particular, to antenna systems configured to transmit and receive a wireless signal in and from different directions.

BACKGROUND

Antenna systems with wide steering angle and high directivity are sought for in the wireless communications. In classical planar phased array antennas, the directivity decreases with the increase in the steering angle of the beam, thus limiting the steering angle range available for operation.

Lens-based phased array antennas are capable of providing for wider steering angle ranges. However, the directivity performance of such lens-based antennas can be susceptible to significant losses at steering angles equal or very close to the normal direction.

SUMMARY

An object of the present disclosure is to provide a switchable lens antenna for transmission of a radio-frequency (RF) wave configured to transmit and receive a wireless signal in and from different directions. The antenna as described herein is configured to operate in two modes depending on an initial steering angle of the RF wave propagating in a parallel-plate waveguide structure. The antenna may operate in a first mode when the initial steering angle is about or less than a threshold steering angle and in a second mode when the initial steering angle is higher than the threshold steering angle. This two-mode operation of the switchable lens antenna may permit reducing losses at steering angles equal or close to the normal direction when the switchable lens antenna is in the first mode. On the other hand, the switchable lens antenna may provide for wider steering angle ranges when in the second mode.

In accordance with this objective, an aspect of the present disclosure provides the switchable lens antenna for transmission of the RF wave. The switchable lens antenna comprises a parallel-plate waveguide structure; excitation ports operable to radiate the RF wave into the parallel-plate waveguide structure in an initial steering angle; and a frequency selective structure having frequency selective elements. Each frequency selective element comprises a stub, configured to introduce a phase variance to modify the steering angle of the RF wave when the stub is electrically connected to the parallel-plate waveguide structure, and a switchable element. The switchable element is operatively connected to the stub and the parallel-plate waveguide structure. The switchable element is configured to selectively electrically disconnect the stub from the parallel-plate waveguide structure when the antenna is in a first operational mode and to electrically connect the stub to the parallel-plate waveguide structure when the antenna is in a second operational mode. The antenna may be in the first operational mode in response to the initial steering angle of the RF wave radiated by the excitation ports being about or less than a threshold steering angle. The antenna may be in the second operational mode in response to the initial steering angle of the RF wave radiated by the excitation ports being higher than the threshold steering angle.

In accordance with additional aspects of the present disclosure, there is provided a frequency selective structure for a lens-based antenna, the lens-based antenna having the parallel-plate waveguide structure and excitation ports operable to radiate RF wave into the parallel-plate waveguide structure in an initial steering angle. The frequency selective structure comprises a frequency selective element having: a stub configured to introduce a phase variance to modify the steering angle of the RF wave when electrically connected to the parallel-plate waveguide structure; and a switchable element operatively connected to the stub and to the parallel-plate waveguide structure, the switchable element configured to selectively electrically disconnect the stub from the parallel-plate waveguide structure when the antenna is in a first operational mode and to electrically connect the stub to the parallel-plate waveguide structure when the antenna is in a second operational mode.

The switchable lens antenna may further comprise a controller configured to determine operational mode of the antenna. The controller may operate the switchable element to selectively electrically disconnect the stub from the parallel-plate waveguide structure when the antenna is in the first operational mode and to electrically connect the stub to the parallel-plate waveguide structure when the antenna is in the second operational mode.

In accordance with additional aspects of the present disclosure, there is provided a method for wireless communication. The method comprises determining an initial steering angle of RF wave radiated into the parallel-plate waveguide structure; in response to the initial steering angle being lower than the threshold steering angle, electrically disconnecting frequency selective elements from the parallel-plate waveguide structure; and in response to the initial steering angle being higher than the threshold steering angle, electrically connecting the frequency selective elements to the parallel-plate waveguide structure to introduce a phase variance to modify the steering angle of the RF wave propagating in the parallel-plate waveguide structure. The frequency selective elements are located in at least one frequency selective structure row, each frequency selective structure row being approximately equally distant from a geometrical center of excitation ports radiating the RF wave into the parallel-plate waveguide structure.

The threshold steering angle may be about a half of a half-power beam width of the RF wave radiated by the excitation ports at a boresight when the antenna is in the first operational mode.

The frequency selective elements may comprise a first frequency selective element having a first stub and a second frequency selective element having a second stub. The second frequency selective element may be located further away from a boresight of the antenna and the second stub is longer than the first stub.

The switchable lens antenna may further comprise vertically polarized radiators located at an output of the parallel-plate waveguide structure and configured to vertically polarize the RF wave.

The frequency selective element may be electrically connected to the parallel-plate waveguide structure through a via electrically connected to a ground surface of the parallel-plate waveguide structure. The switchable element may be a diode. The parallel-plate waveguide structure may be a printed circuit board.

A distance between neighbouring frequency selective elements in each frequency selective structure row may be approximately the same.

Implementations of the present disclosure each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which.

Figure 1:
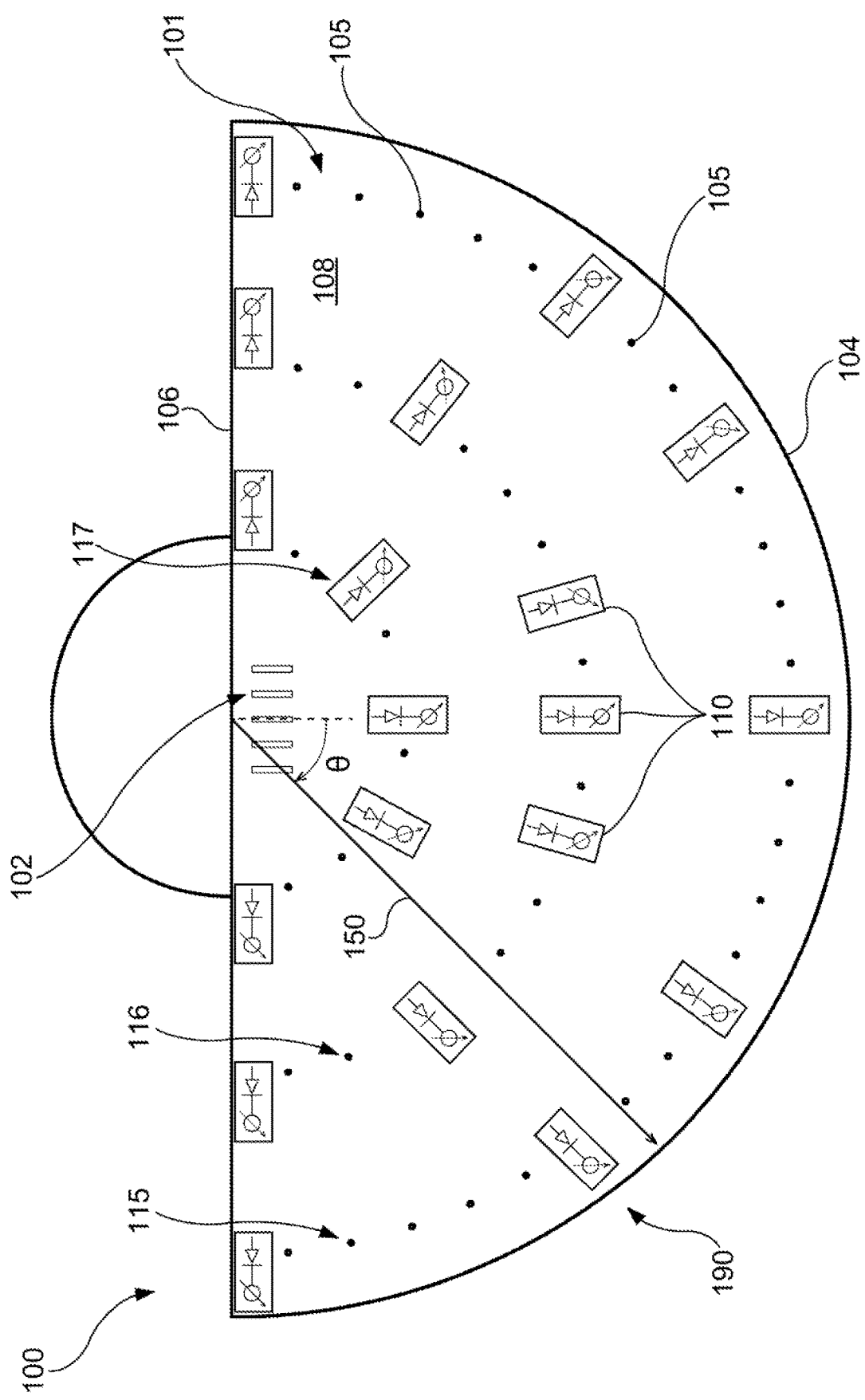
FIG. 1 depicts a top view of a switchable lens antenna, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current lens-based phased array antennas implementations. In particular, the instant disclosure describes a switchable lens-based phased array antenna (also referred to herein as a "switchable lens antenna"), having a parallel-plate waveguide structure and an integrated frequency selective structure (FSS), that is configured to provide increased angular ranges and polarization agility while minimizing directivity losses at steering angles near the normal direction of the switchable lens antenna.

The technology described herein may be used in a base station (BS) and may also be used in user equipment (UE).

The electromagnetic (EM) wave that propagates inside and is radiated by the switchable lens antenna may be within a radio frequency (RF) range and is referred herein to as an RF wave. In some embodiments, the RF wave may be a millimeter wave range. For example, the frequencies of the RF wave may be between about 30 GHz and about 300 GHz. In some other embodiments, the RF wave may be in a microwave wave range. For example, the frequencies of the RF wave may be between about 1 GHz and about 30 GHz.

As used herein, the term "about" or "approximately" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The switchable lens antenna as described herein may, in various embodiments, be formed from appropriate features of a multilayer printed circuit board (PCB), such as features formed by etching of conductive layers, vias, and the like. Such a PCB implementation may be suitably compact for inclusion in wireless communication equipment, such as mobile communication terminals, as well as being suitable for cost-effective volume production.

A via, as referred to herein, is an electrical connection between layers in a physical electronic circuit that goes through planes of one or more adjacent layers.

The switchable lens antenna as described herein has a frequency selective structure (FSS) and is configured to function in two operational modes. In a first operational mode, the switchable lens antenna does not introduce phase variation to the electromagnetic (EM) wave propagating in the parallel-plate waveguide structure. In this first operational mode, when the direction of a beam of the RF wave is close to normal direction, i.e. when the steering angle is close to zero, directivity is approximately the same as in an antenna without the FSS.

In a second operational mode, the switchable lens antenna introduces a phase variation to the RF wave propagating in the parallel-plate waveguide structure. The phase variation is introduced by the FSS of the switchable lens antenna. The beam of the RF wave, which propagates at a larger steering angle will experience an increase of its steering angle while propagating through the switchable lens antenna. The new steering angle is larger than the initial steering angle of the RF wave. The RF wave is diverged and then refracted further away from the normal direction when exiting the switchable lens antenna operating in the second operational mode.

FIG. 1 depicts a schematic top view of a switchable lens antenna 100, in accordance with at least one non-limiting embodiment of the present technology. In the depicted embodiment, the switchable lens antenna 100 has a parallel-plate waveguide structure 101, excitation ports 102, and FSS 190.

The parallel-plate waveguide structure 101 has two parallel conductive surfaces: a top waveguide surface 107, depicted in FIG. 1, and a ground surface (not shown in FIG. 1). In illustrated embodiments, the distance between the two parallel conductive surfaces of the parallel-plate waveguide structure is less than half of the distance defined by a wavelength of the propagating EM wave to provide propagation of a transverse electromagnetic mode (TEM).

The parallel-plate waveguide structure 101 has a half-circular (semicircular) shape having a circumference 104 and a diameter side 106. It is contemplated that the parallel-plate waveguide structure 101 may have any other shape that may be used for radiation of the RF wave therefrom. The selection of the half-circular shape is simply used herein for illustrative purposes.

The switchable lens antenna 100 has excitation ports 102 located at or on diameter side 106. In some embodiments they may be preferably located at or near a central portion of diameter side 106 of switchable lens antenna 100. The excitation ports 102 are sources of radiation of an electromagnetic (EM) wave. The excitation ports 102 form a linear phased array and are configured such that the RF wave may be radiated at an initial steering angle θ and may propagate radially in the parallel-plate waveguide structure 101 from the excitation ports 102, e.g. from a center of the excitation ports 102, towards circumference 104 of the parallel-plate waveguide structure 101.

It should be noted that the number of excitation ports 102 may be determined from total gain required from the switchable lens antenna 100. The more excitation ports 102 in the linear phased array, the higher is the gain of the switchable lens antenna 100.

A plurality of frequency selective elements (FSE) 110 form FSS 190. The FSS 190 is configured to provide a phase shift to RF wave 150, generated by excitation ports 102, while it propagates towards circumference 104. As shown at FIG. 1, FSEs 110 are positioned radially on the parallel-plate waveguide structure 101.

The FSE 110 may be positioned in at least one FSE row 115, 116, 117, where each FSE 110 is located radially at about equal distance from a geometrical center of excitation ports 102. The distance between neighbouring FSE 110 in each FSE row 115, 116, 117, may be approximately the same.

Figure 2A:
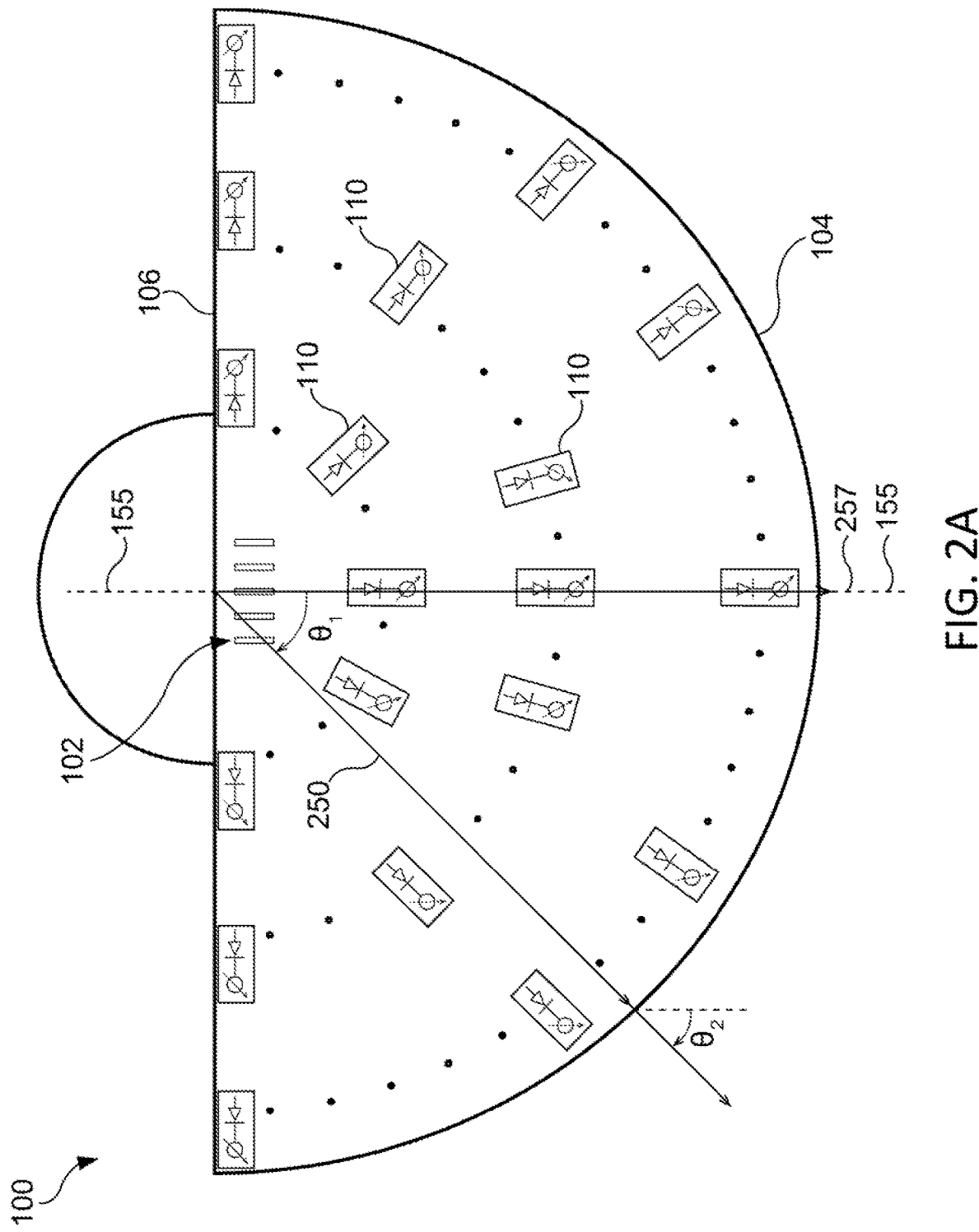
FIG. 2A depicts the top view of the switchable lens antenna of FIG. 1 and schematically depicts propagation of the RF wave in the first operational mode of the switchable lens antenna of FIG. 1, in accordance with various embodiments of the present disclosure.
Figure 2B:
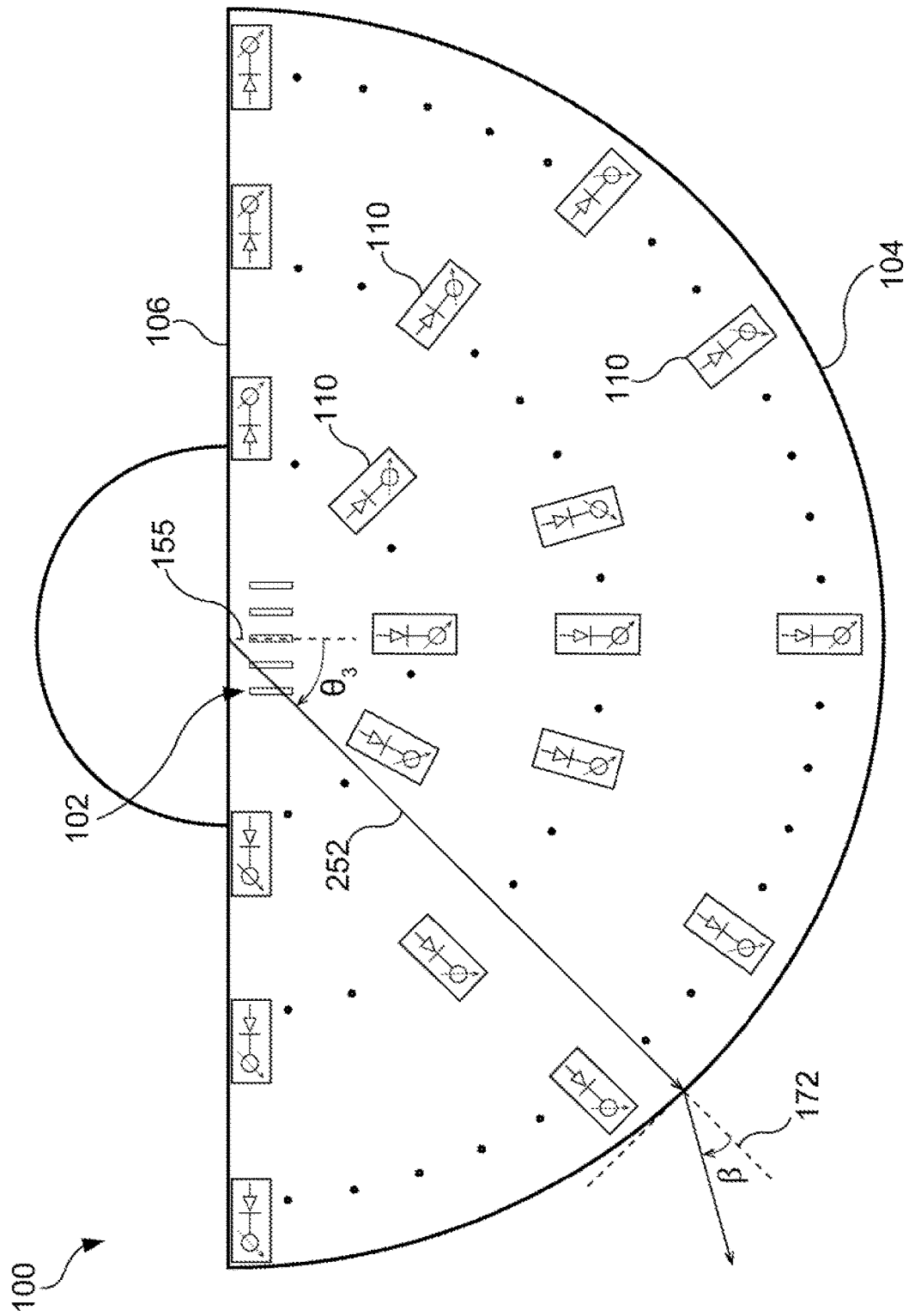
FIG. 2B depicts the top view of the switchable lens antenna of FIG. 1 and schematically depicts propagation of the RF wave in the second operational mode of the switchable lens antenna of FIG. 1, in accordance with various embodiments of the present disclosure.

FIG. 2A schematically depicts the propagation of RF wave 250 in the first operational mode and FIG. 2B schematically depicts the propagation of RF wave 252 in the second operational mode of switchable lens antenna 100, in accordance with embodiments of the disclosed technology.

Steering angles $\theta_1$, $\theta_3$ of RF waves 250, 252, respectively, are calculated with reference to a normal direction axis 155 that is perpendicular (i.e. at approximately 90°) to the diameter side 106. It should be understood that the normal direction of switchable lens antenna 100 may coincide with the antenna boresight.

Referring to FIG. 2A, when switchable lens antenna 100 is in the first operational mode, FSS 190 is in the OFF mode. The RF wave 250 propagates within the confines of switchable lens antenna 100 to radially radiate towards the circumference 104 and leaves switchable lens antenna 100 at the same angle $\theta_2$ as initial steering angle $\theta_1$ ($\theta_1 \cong \theta_2$). Directivity of the RF wave 150 decreases with the increase in the steering angle $\theta_1$ when the FSS 190 is in the OFF mode. In this mode, the directivity of the in antenna behaves the same way as it would in an antenna without any FSS.

Referring now to FIG. 2B, where switchable lens antenna 100 is depicted in the second operational mode. The RF wave 252 propagates inside switchable lens antenna 100 radially towards circumference 104 at a steering angle θ3.

When switchable lens antenna 100 is in the second operational mode, RF wave 252 refracts away from an RF wave propagation axis 172 (that continues along the direction of propagation of RF wave 252) inside switchable lens antenna 100. The RF wave propagation axis 172 is normal to circumference 104.

An angle of refraction p of RF wave 252, calculated from RF wave propagation axis 172, may be controlled by FSS 190. In particular, the total number of FSE 110, their structure and their position parameters with respect to each other in switchable lens antenna 100 may determine the angle of refraction p. The position parameters of FSE 110 relative to each other may include, for example, number of rows with FSE 110, number of FSE 110 in each particular row, distances between FSE 110, etc.

Figure 3:
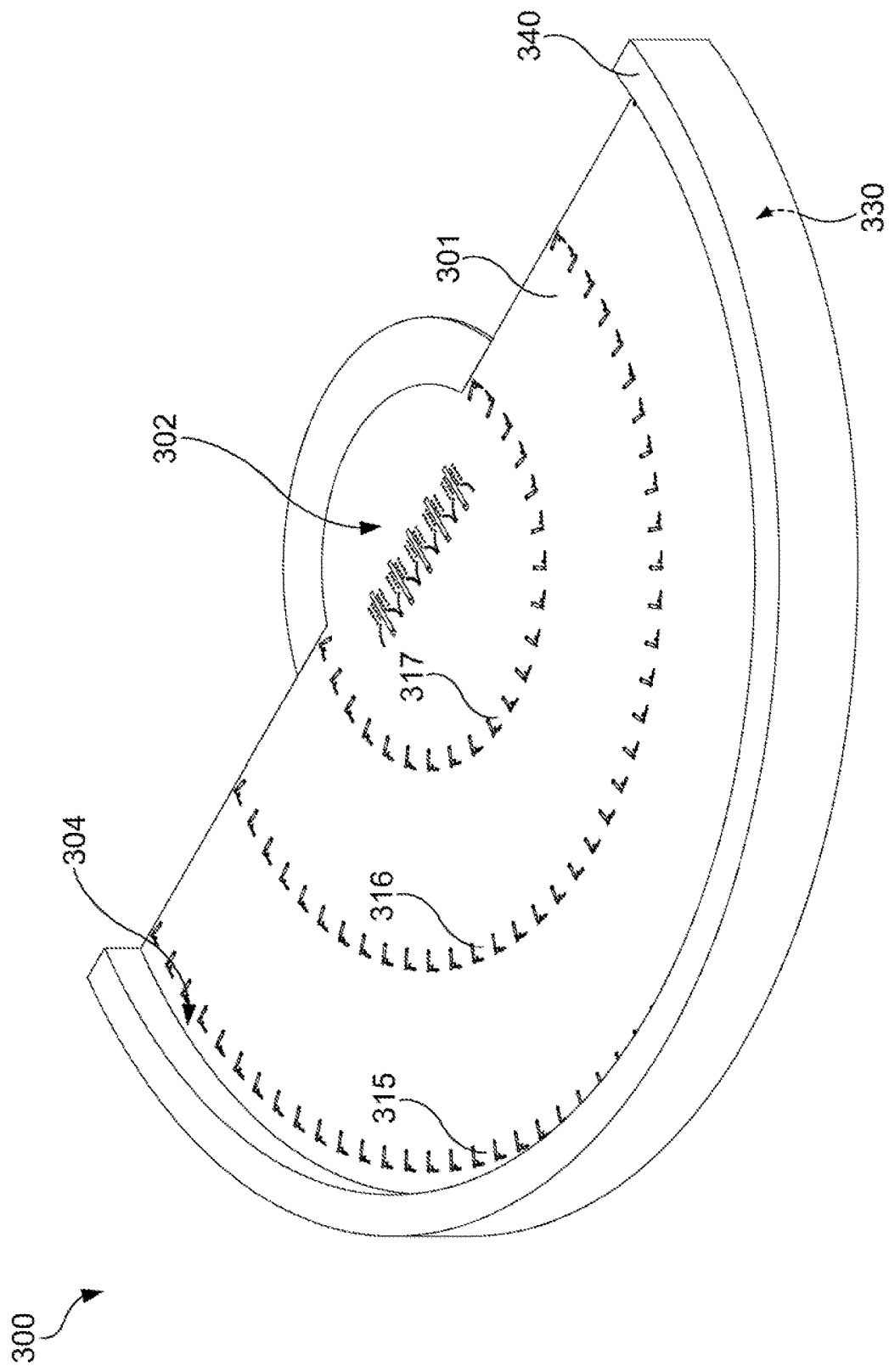
FIG. 3 depicts a perspective view of the switchable lens antenna, in accordance with various embodiments of the present disclosure.

FIG. 3 depicts a perspective view of a switchable lens antenna 300, in accordance with non-limiting embodiment of the present technology. The switchable lens antenna 300 depicted in FIG. 3 has five excitation ports 302. The FSE 110 are positioned in FSE rows 315, 316, 317.

The switchable lens antenna 300 radiates the RF wave through waveguide opening 330 from circumference 304. A wall 340 may be positioned around the circumference 304 of the switchable lens antenna 300 to improve a radiation pattern of the RF wave, such as, for example, to reduce the beam side lobes and to increase gain. Wall 340 may be constructed from suitable materials, such as, for example, metal-based materials. The RF wave may be also transmitted to other types of radiators, as discussed below.

The parallel-plate waveguide structure 101, 301 of switchable lens antenna 100, 300 may be made of a planar circuit board (PCB). Alternatively, the parallel-plate waveguide structure 101 may be made with metallic plates which may be assembled with a circuit board. The parallel-plate waveguide structure 101 may also be made using low temperature co-fired ceramics (LTCC) or liquid crystal polymer (LCP) technology.

In at least one embodiment, switchable lens antenna 100, 300 comprises parallel-plate waveguide structure 101, excitation ports and FSS 190.

The FSS 190 comprises a plurality of FSE 110. The structure of FSE 110 will now be described in further detail.

Figure 4:
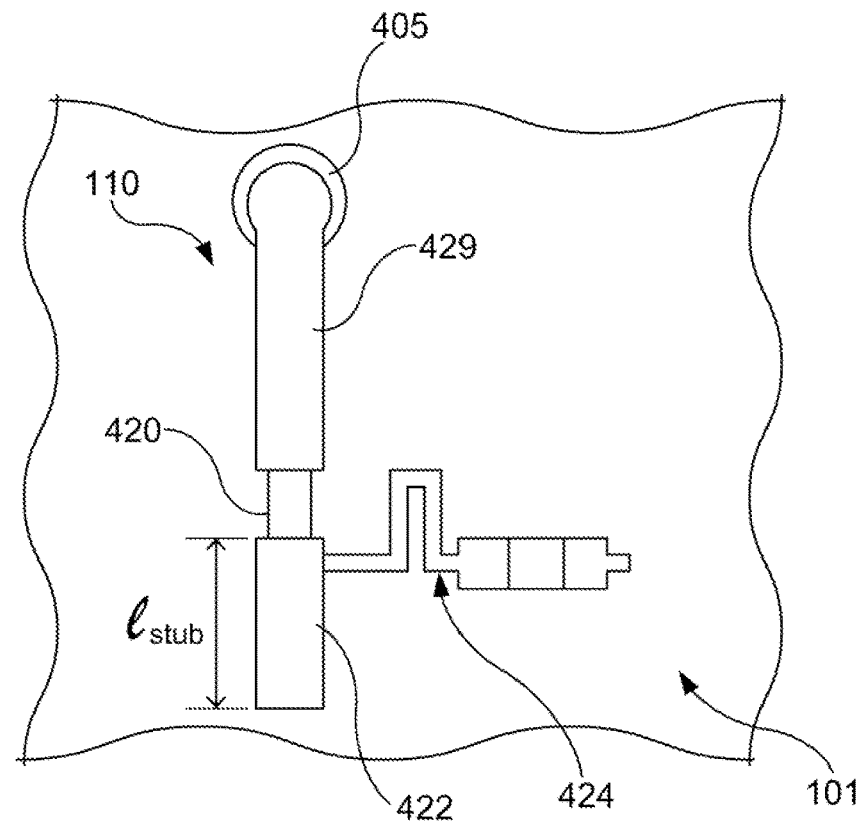
FIG. 4 depicts a top view of a frequency selective element (FSE) in a portion of the switchable lens antenna of FIG. 1, in accordance with various embodiments of the present disclosure.
Figure 5:
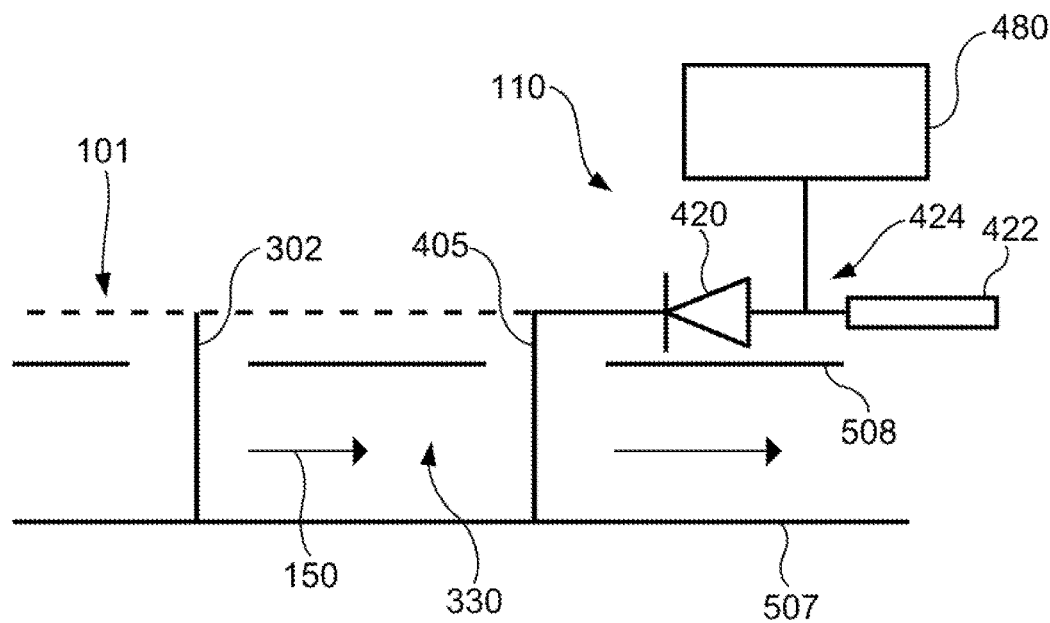
FIG. 5 depicts an elevation side view of the FSE and the surrounding portion of the switchable lens antenna of FIG. 4.

FIG. 4 depicts a view of FSE 110 in a portion of switchable lens antenna 100. FIG. 5 depicts an elevation side view of FSE 110 and a surrounding portion of switchable lens antenna 100. The FSE 110 is operably connected to parallel-plate waveguide structure 101 and has a switchable element 420, a stub 422, and a DC circuit 424.

The stub 422 is a finite transmission line of length $l_{stub}$ and may be implemented as any of a microstrip line, a substrate integrated waveguide, a stripline, a coplanar waveguide, or the like.

The switchable element 420 may be a PIN diode such as a beam lead PIN diode. In at least one another embodiment, switchable element 420 may be a microelectromechanical systems (MEMS) element.

Referring to FIG. 5, parallel-plate waveguide structure 101 may have a waveguide 330, a ground surface 507 and a top surface 508. The FSE 110 may be located on the top surface 508 of the parallel-plate waveguide structure 101 and connected to parallel-plate waveguide structure 101 by a via 405. The via 405 may be electrically connected to ground surface 507 and may pass through an aperture formed in the top surface 508 of the parallel-plate waveguide structure 101 to join the FSE 110.

The switchable element 420 of the FSE 110 is operatively connected to stub 422 and to parallel-plate waveguide structure 101. The switchable element 420 may also be connected through DC circuit 424 to a controller 480. The controller 480 may be, for example, a DC voltage controller.

The controller 480 may operate the switchable element 420 that is configured to selectively electrically connect and disconnect stub 422 to and from parallel-plate waveguide structure 101. In particular, the switchable element 420 may electrically connect and disconnect stub 422 to and from via 405.

It should be understood that the FSE 110 may have an additional via connector 429 that may connect via 405 to switchable element 420.

The controller 480 is configured to control operation of switchable element 420. The controller 480 may be configured to determine steering angle θ of the RF wave radiated by excitation ports 102, 302. For example, controller 480 may compare the determined steering angle θ of the RF wave with a threshold steering angle to determine operational mode of switchable lens antenna 100, 300.

In at least one embodiment, the threshold steering angle may be approximately a half of the half-power beam width (a half of the −3 dB beam width). The threshold steering angle may depend on the required gain of the antenna for a particular application. For example, the threshold steering angle may between about 5° and about 10°. In particular, the threshold steering angle may be about 5°.

The controller 480 may determine whether switchable lens antenna 100 should operate in the first operational mode or the second operational mode. The controller 480 may operate switchable element 420 to selectively electrically disconnect stub 422 from via 405 and, therefore, from parallel-plate waveguide structure 101, in the first operational mode, and to electrically connect stub 422 to via 405 and, therefore, to parallel-plate waveguide structure 101, in the second operational mode.

With reference also to FIG. 2A and FIG. 2B, controller 480 may compare steering angle $\theta_1$, $\theta_3$ of RF wave 250, 252 to the threshold steering angle. For example, when steering angle $\theta_1$ of RF wave 250 is about or less than the threshold steering angle, the switchable lens antenna 100 may be configured to operate in the first operational mode. The controller 480 may electrically disconnect the stub 422 from via 405 by switchable element 420, such as, for example, by supplying to the switchable element 420 DC voltage lower than a voltage threshold. The stub 422 can be electrically disconnected from via 405 by switchable element 420 when switchable element 420 is in an OFF state. When electrically disconnected from via 405, stub 422 is also disconnected from the parallel-plate waveguide structure 101. When switchable element 420 is in the OFF state, stub 422 is disconnected and does not affect the phase of the RF wave 250 and therefore does not affect transmission coefficient of RF wave 250 when it passes through FSE 110.

When switchable element 420 is in the ON state, stub 422 is electrically connected by switchable element 420 to via 405, such as, for example, through via connector 429. The controller 480 may bring switchable lens antenna 100 into the second operational mode, when initial steering angle $\theta_3$ of RF wave 252 (as radiated by the excitation ports 102 into parallel-plate waveguide structure 101) is more than the threshold steering angle.

In the second operational mode of switchable lens antenna 100, stub 422 is electrically connected to via 424 and therefore to parallel-plate waveguide structure 101 and its ground surface 507. The electrically connected stub 422, grounded via 424, optional via connector 429, as well as switchable element 420 fed by DC circuit 424, form an open circuit. Such open circuits in FSS 190 introduce phase variance to RF wave 252 when RF wave 252 passes through the FSS 190 and therefore introduces phase variance to the transmission coefficient of RF wave 252.

The phase variance, introduced by FSS 190, causes a shift in RF wave propagation angle by a FSS propagation angle shift β, thus the RF wave, after passing through FSS 190 propagates at an angle $\theta_3+\beta$.

The propagation angle shift β depends on a number of FSE rows 315, 316, 317, a distance between the FSE 110 in each FSE row 315, 316, 317, and a phase difference Δφ introduced by adjacent FSEs 110.

Figure 6:
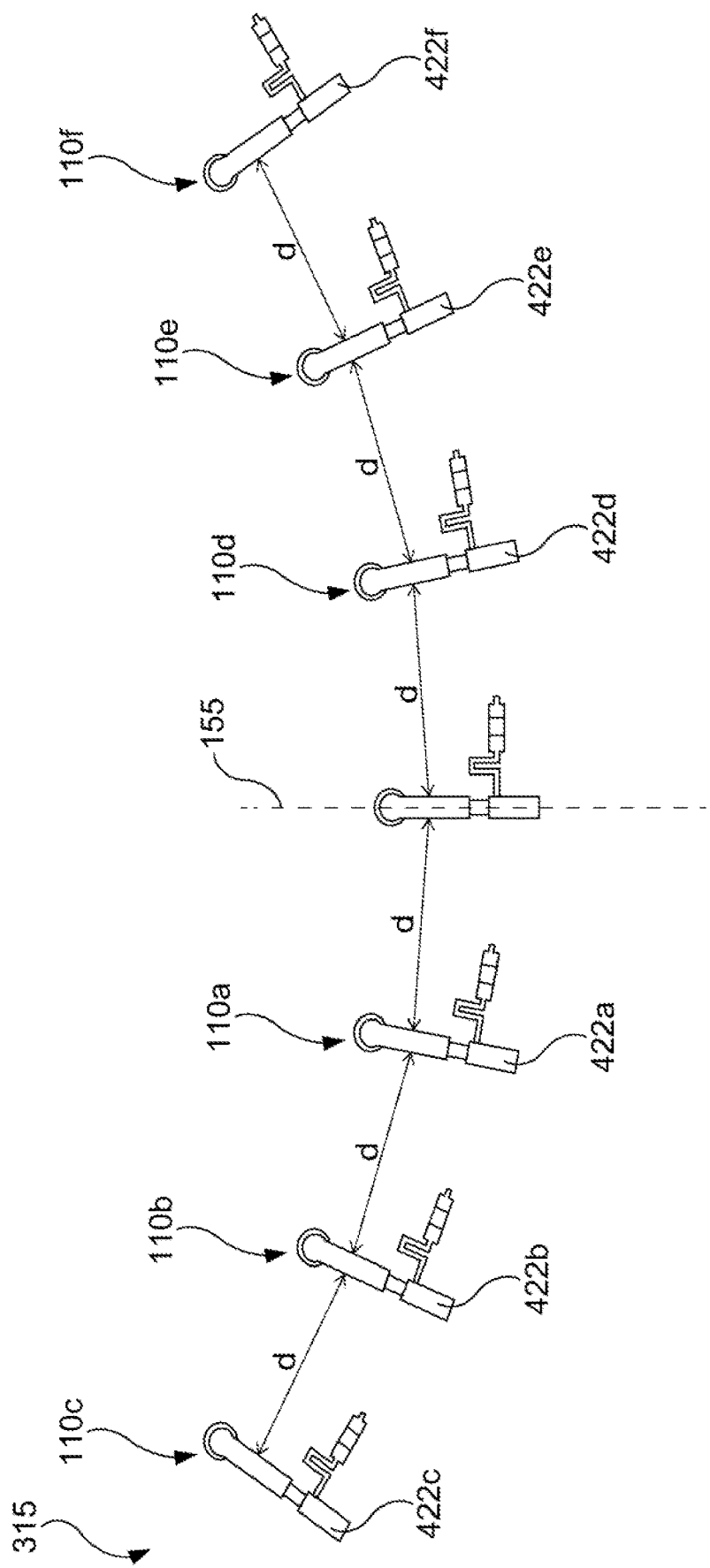
FIG. 6 depicts a top view of a portion of the switchable lens antenna of FIG. 3, in accordance with various embodiments of the present disclosure.

FIG. 6 depicts a top view of a portion of switchable lens antenna 300. Each FSE 110a, 110b, 110c, 110d, 110e, 110f introduces a phase shift Δφ due to difference in lengths between neighbouring stubs 422a, 422b, 422c, 422d, 422e, 422f, if lengths of via 405, stub 422, switchable element 420 and optional via conductor 429 are equal for all FSE 110. As discussed above, the open circuit in each FSE 110 is determined by a combination of via 405, stub 422, switchable element 420 and optional via conductor 429. Therefore, the phase difference Δφ may be introduced due to the variance in open circuit lengths (which may include lengths of via 405, stub 422, switchable element 420 and via conductor 42) of neighbouring FSEs 110.

Each FSE 110 may have stub length (or open circuit length, as discussed above) different from the neighbor's stub length (or open circuit length). In some embodiments, different FSEs 110 in one FSE row 315 may have different lengths of stubs 422. The FSE 110 in one row 315 may have approximately the same distance between each neighboring pair of FSEs 110.

The lengths of stubs 422 in the FSE rows 315, 316, 317, 630 may be chosen such that the RF wave, after passing through FSS 190, propagates at a different angle with regards to its angle of propagation before passing through FSE 190, e.g. initial steering angle θ as radiated by the excitation ports 302. For example, the length of stubs 422a, 422b, 422c of one FSE row 315 may gradually increase or decrease depending on the distance of FSE 110 from the normal direction axis 155.

In a preferred embodiment, stubs 422 may be longer, when the corresponding FSE 110 is located further away from normal direction axis 155. Referring to FIG. 6, stub length of first stub 422a may be shorter than stub length of second stub 422b, and stub length of fourth stub 422d may be shorter than stub length of a fifth stub 422e.

FSE 110a may introduce phase shift φ$_0$, its neighbouring FSE 110b may introduce phase shift φ$_0$+Δ$_φ$, and its neighbouring FSE 110c may introduce phase shift φ$_0$+2Δφ, etc.

The phase difference Δ$_T$ between two adjacent FSEs 110 may be approximately the same. The angle of propagation of RF wave, after passing through one FSE row 315, may be shifted by row propagation shift angle Δθ, where Δθ may be estimated from the following equation:

$$\Delta\varphi \approx \frac{2\pi f}{c} d\cos\Delta\theta, \quad (1)$$

where d is the distance between FSE 110; c is the speed of light in free space; f is the frequency of the RF wave. It should be noted that the equation (1) is an estimation and does not take into account curvatures of the FSE rows 315, 316, 317, 630. The FSS propagation angle shift β (FSS angle of refraction) may depend on a number of rows in the FSS 190 and propagation shift Δθ for each row.

The difference between the length of neighboring stubs 422 may be between 0 and a quarter of the guided wavelength (corresponding to lowest frequency of propagating RF wave). If difference between the lengths of the neighboring stubs 422 is too long, FSEs 110 may be reflecting the RF wave rather than transmitting it.

The length of each stub 422 may be determined before manufacturing of switchable lens antenna 300. This may be done by analysis of a two port transmission line. The wider is the achievable variation of the phase shift, the greater may be the FSS angle of refraction and thus the steering angle range of the switchable lens antenna 300.

Figure 7A:
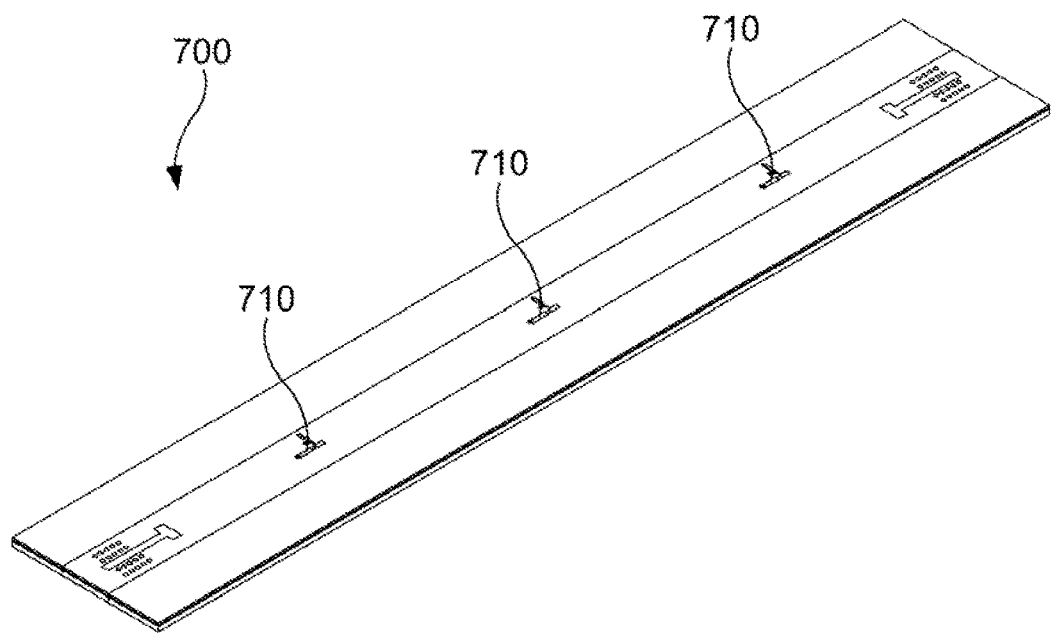
FIG. 7A depicts a rectangular waveguide for determining parameters of the switchable lens antenna of FIG. 3.
Figure 7B:
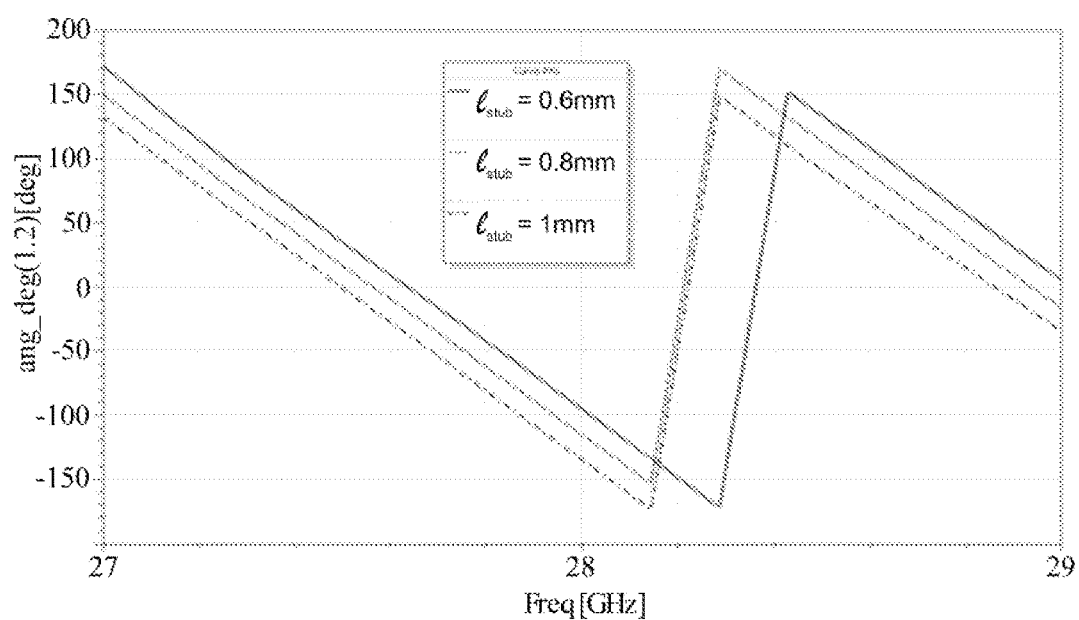
FIG. 7B depicts measured phase variation of transmission coefficient of RF wave propagating through rectangular waveguide of FIG. 7A.

FIG. 7A depicts a rectangular waveguide 700 with three FSE 710 and FIG. 7B depicts measured phase variation of transmission coefficient of RF wave propagating through rectangular waveguide 700 for different lengths of stubs of FSEs 710 as a function of frequency of RF wave. In implementation, one may use such rectangular waveguide to estimate the length of stubs of FSEs 710.

Phase variations for the RF wave propagating in the parallel-plate waveguide structure 101 may be created when switchable lens antenna 100 is in the second operational mode (ON state of the switchable element 420). In the first operational mode of switchable lens antenna 100 (when switchable element 420 is in the OFF state), no phase variation is created.

Figure 8:
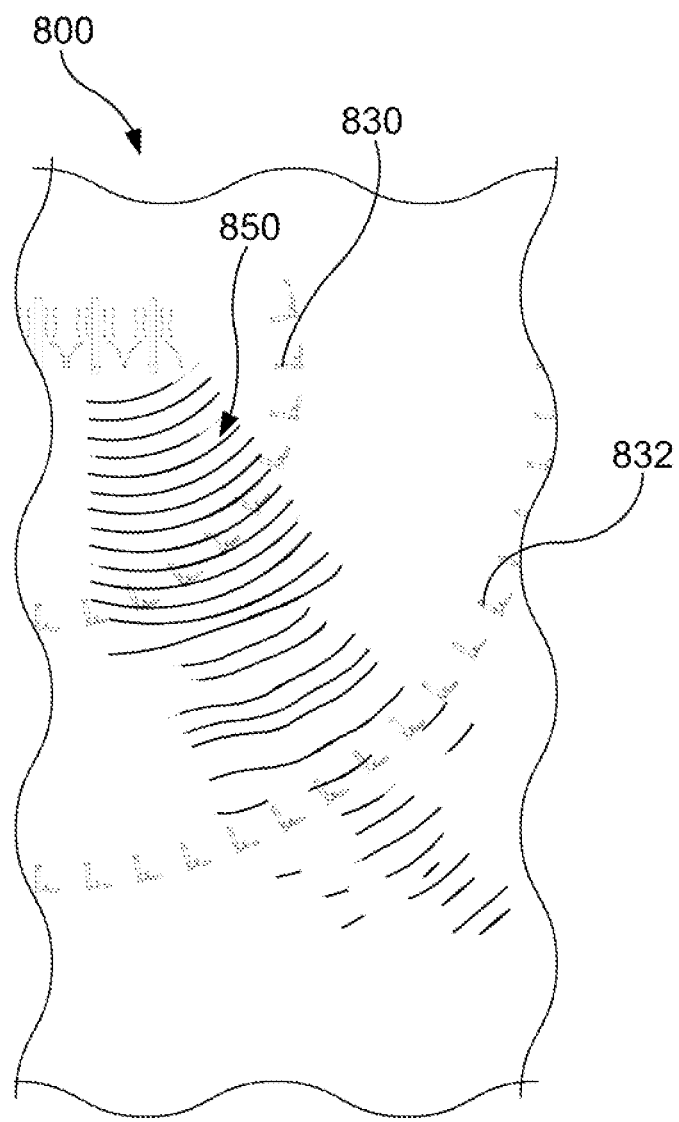
FIG. 8 depicts a portion of the switchable lens antenna of FIG. 3 and schematically depicts the propagation of the RF wave therein.

FIG. 8 depicts simulated propagation of RF wave 850 in a portion 800 of switchable lens antenna 300. The direction of propagation of RF wave 850 changes and therefore the angle of propagation of RF wave 850 changes after propagation through each FSE row 830, 832.

Figure 9A:
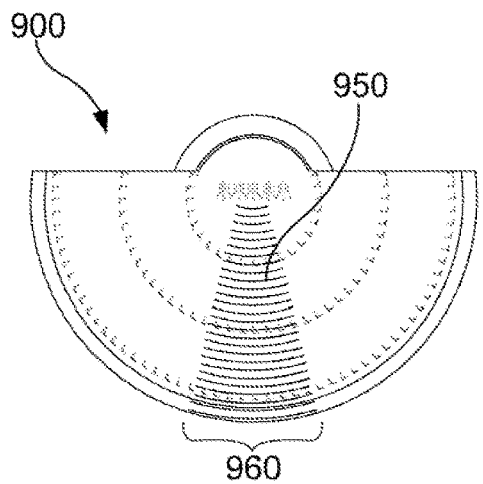
FIG. 9A depicts simulated propagation of the RF wave in the switchable lens antenna in the first operational mode when the steering angle is small.
Figure 9B:
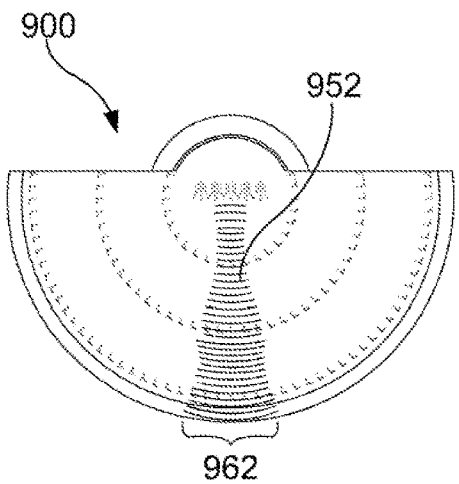
FIG. 9B depicts simulated propagation of the RF wave in the switchable lens antenna in the second operational mode when the steering angle is small.

FIG. 9A and FIG. 9B depict simulated propagation of RF waves 950, 952 in switchable lens antenna 900 when the steering angle θ is about or less than the threshold steering angle (for example, θ≤5°). FIG. 9A depicts propagation of RF wave 950 in switchable lens antenna 900 when switchable lens antenna 900 is in the first operational mode (switchable elements 420 of FSS 190 are in the OFF state). FIG. 9B depicts propagation of RF wave 952 in switchable lens antenna 900 when switchable lens antenna 900 is in the second operational mode (switchable elements 420 are in the ON state).

When switchable lens antenna 900 is in the second operational mode, the aperture 962 of RF wave 952, after propagation through antenna 900, is narrower compared to the correspond aperture 960 of RF wave 950 which is propagated through switchable lens antenna 900 while in the first operational mode. As can be seen, this is for a small steering angle θ. The gain of the switchable lens antenna 900 is smaller when the switchable lens antenna 900 is in the second operational mode.

Figure 10A:
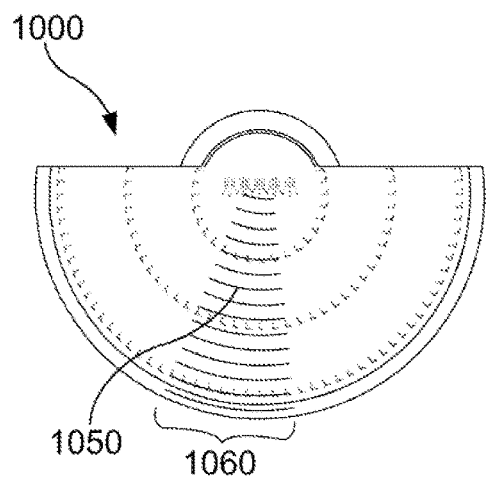
FIG. 10A depicts simulated propagation of the RF wave in the switchable lens antenna in the first operational mode when the steering angle is between about 5° and about 200.
Figure 10B:
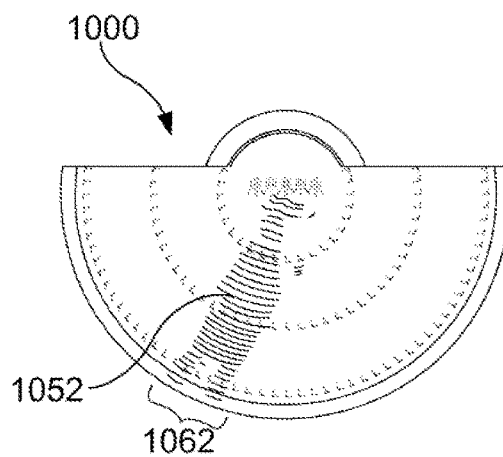
FIG. 10B depicts simulated propagation of the RF wave in the switchable lens antenna in the second operational mode when the steering angle is between about 5° and about 20°.

FIG. 10A and FIG. 10B depict simulated propagation of RF waves 1050, 1052 in a lens 1000 when the steering angle θ is between about 5° and about 20° (e.g. θ≅15°). FIG. 10A depicts propagation of RF wave 1050 in switchable lens antenna 1000 when switchable lens antenna 1000 is in the first operational mode (switchable element 420 is in the OFF state). FIG. 10B depicts propagation of RF wave 1052 in the switchable lens antenna 1000 when switchable lens antenna 1000 is in the second operational mode (switchable element 420 is in the ON state). The steering angle θ shifts by between about 10° and about 15° when switchable lens antenna 1000 is in the second operational mode compared to the first operational mode. An aperture 1062 of RF wave 1052 is narrower than to an aperture 1060 of RF wave 1050.

Figure 11A:
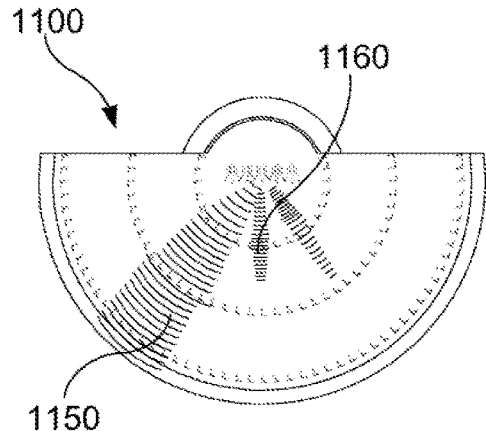
FIG. 11A depicts simulated propagation of the RF wave in the switchable lens antenna in the first operational mode when the steering angle is more than about 20°.
Figure 11B:
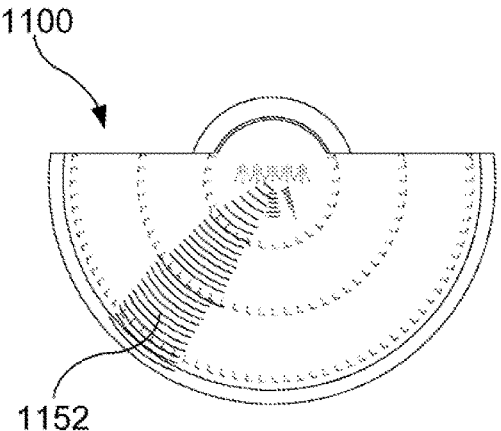
FIG. 11B depicts simulated propagation of the RF wave in the switchable lens antenna in the second operational mode when the steering angle is more than about 20°.

FIG. 11A and FIG. 11B depict simulated propagation of RF waves 1150, 1152 in switchable lens antenna 1100 when the steering angle θ is more than about 20° (e.g. θ≅30°). FIG. 11A depicts propagation of RF wave 1150 in switchable lens antenna 1100 when switchable lens antenna 1100 is in the first operational mode (switchable element 420 is in the OFF state). FIG. 1B depicts propagation of RF wave 1152 in the switchable lens antenna 1100 when switchable lens antenna 1100 is in the second operational mode (switchable element 420 is in the ON state). The steering angle θ shifts by about 10 degrees when switchable lens antenna 1100 is in the second operational mode compared to the first operational mode.

Referring again to FIG. 11A, RF wave 1150 may have undesired side radiation 1160, which may occur at the side opposite to the steering angle of the RF wave 1150. Such undesired side radiation may be reduced, as can be seen from FIG. 11B, when the switchable lens antenna 1100 is in the second operational mode.

To increase the aperture and the gain of the of the RF wave when the steering angle θ is about or less than the threshold steering angle, switchable lens antenna 100, 300 operates in the first operational mode. The controller 480 is therefore configured to operate switchable lens antenna 100, 300, and in particular, frequency selective structure 190, in the first operational mode when the steering angle θ is about or less than the threshold steering angle. In the first operational mode the stubs 422 are electrically disconnected from the parallel-plate waveguide structure. When the steering angle θ is higher than the threshold steering angle, controller 480 is configured to operate switchable lens antenna 800, and in particular, frequency selective structure 190, in the second operational mode. In the second operational mode stubs 422 are electrically connected to the parallel-plate waveguide structure. In the second operational mode, the steering angle may increase and undesired side radiation 1060 may be reduced.

Figure 12A:
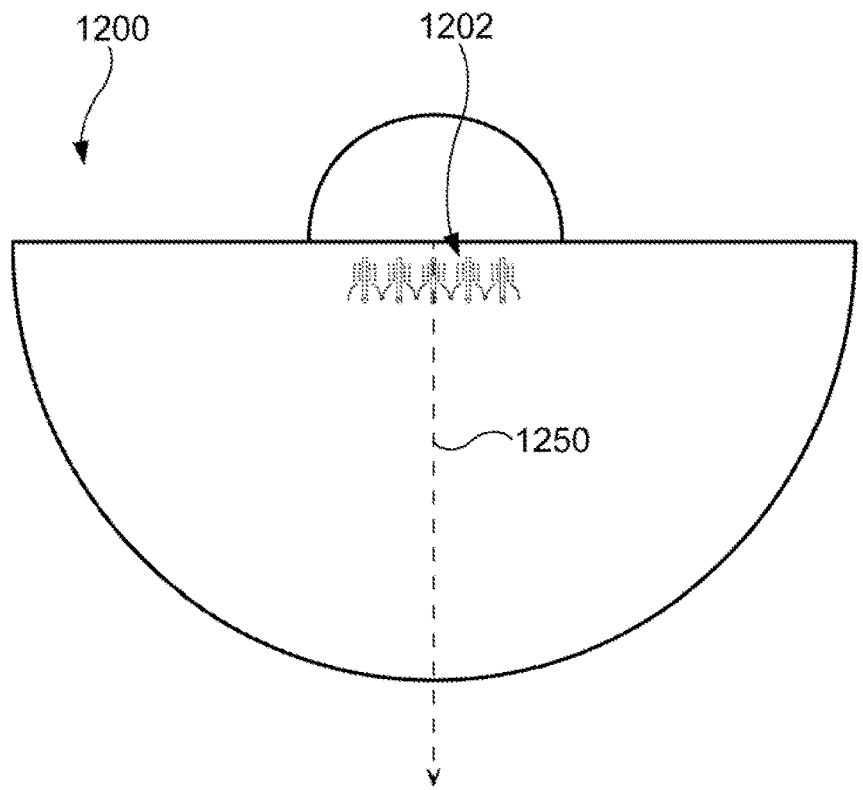
FIG. 12A schematically depicts operation of the switchable lens antenna in the first operational mode, in accordance with various embodiments of the present disclosure.
Figure 12B:
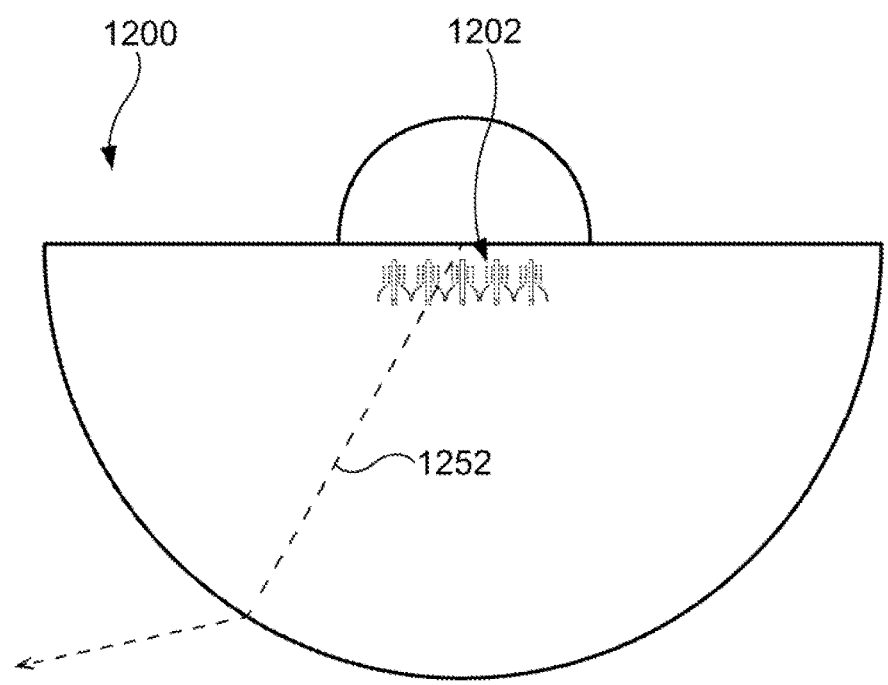
FIG. 12B schematically depicts operation of the switchable lens antenna in the second operational mode, in accordance with various embodiments of the present disclosure.

FIG. 12A and FIG. 12B schematically depict operation of a lens 1200 in the first operational mode (FIG. 12A) and the second operational mode (FIG. 12B). When FSE 110 are in an OFF state (FIG. 12A), RF wave 1250 propagates at low steering angle (θ≅0°). When switchable lens antenna 1200 is in the second operational mode (FIG. 12B), RF wave 1252 may be directed at a larger steering angle θ≥20° such that the phase shift variations introduced by FSS 110 direct the RF wave 1252 out of switchable lens antenna 1200 at an angle β (e.g. when θ is about 30°, β may be about 10°).

The controller 480 (not shown in FIG. 12B) may be used to control the operation of FSE 110 in switchable lens antenna 1200. The controller may coordinate the steering angle of RF wave, excitation ports 1202, and the ON and OFF states of each switchable element 420 of FSE 110.

Each FSE 110 may have more than one stub 422, forming an extended stub, where each additional stub is operatively connected to a corresponding additional switchable element. The switchable element 420 and the additional switchable elements may be controlled by controller 480 and the length of such extended stub may thus be increased or decreased by controller 480.

Additional radiators may be used at circumference 104 of switchable lens antenna 100 to radiate the energy more effectively. The additional radiators may also help to control polarization of the RF wave radiated from switchable lens antenna 100 and to enable polarization agility. It should be understood that the excitation ports 102, 302 may be designed for vertical, horizontal and/or circular polarization of the RF wave.

Figure 13A:
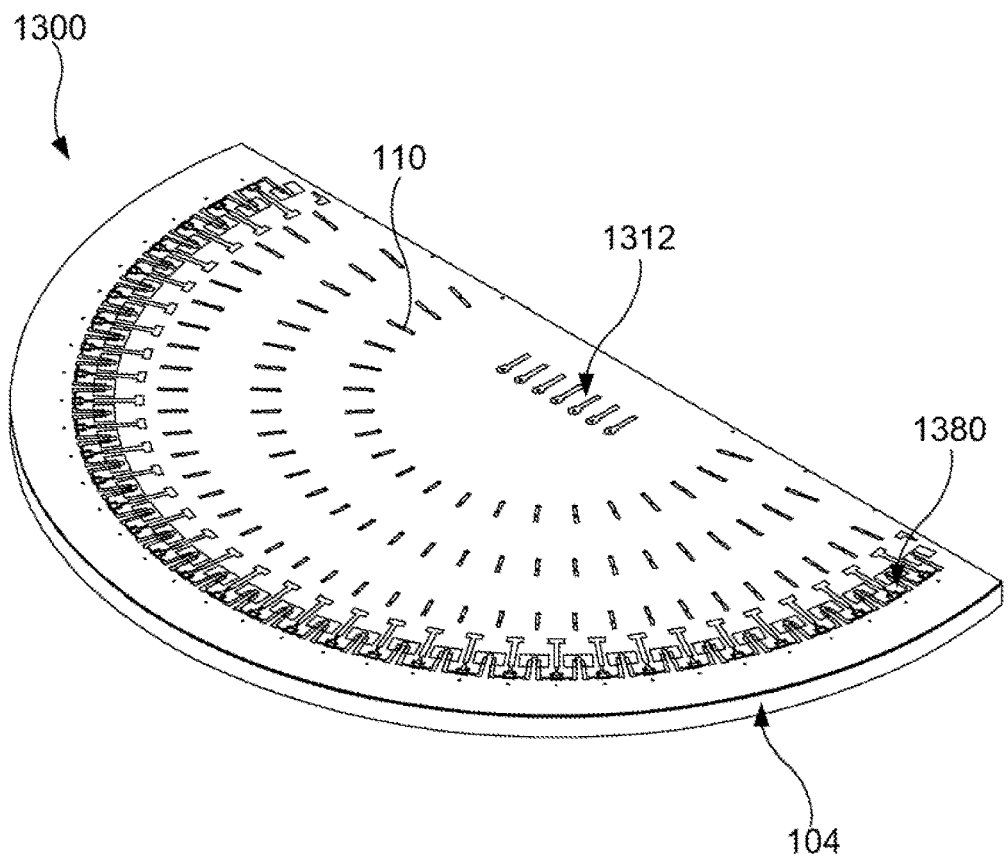
FIG. 13A schematically depicts a perspective view of a switchable lens antenna with vertically polarized radiators, in accordance with various embodiments of the present disclosure.
Figure 13B:
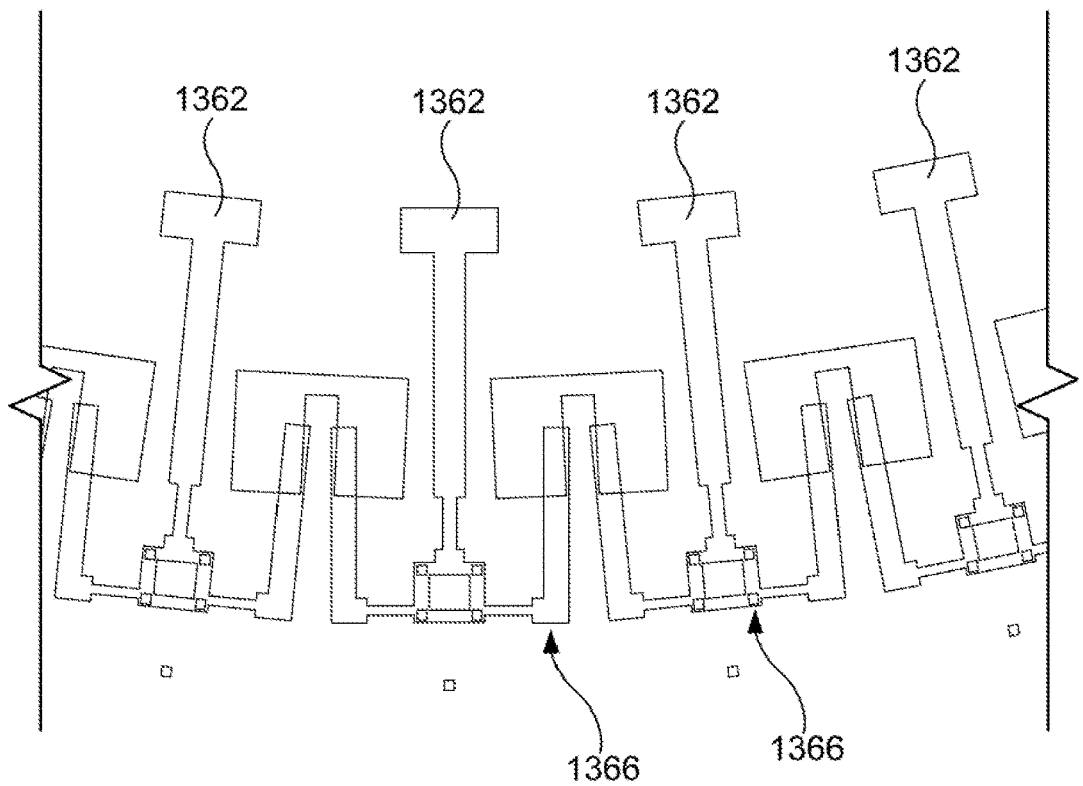
FIG. 13B schematically depicts a top view of a portion of the switchable lens antenna of FIG. 13A.
Figure 13C:
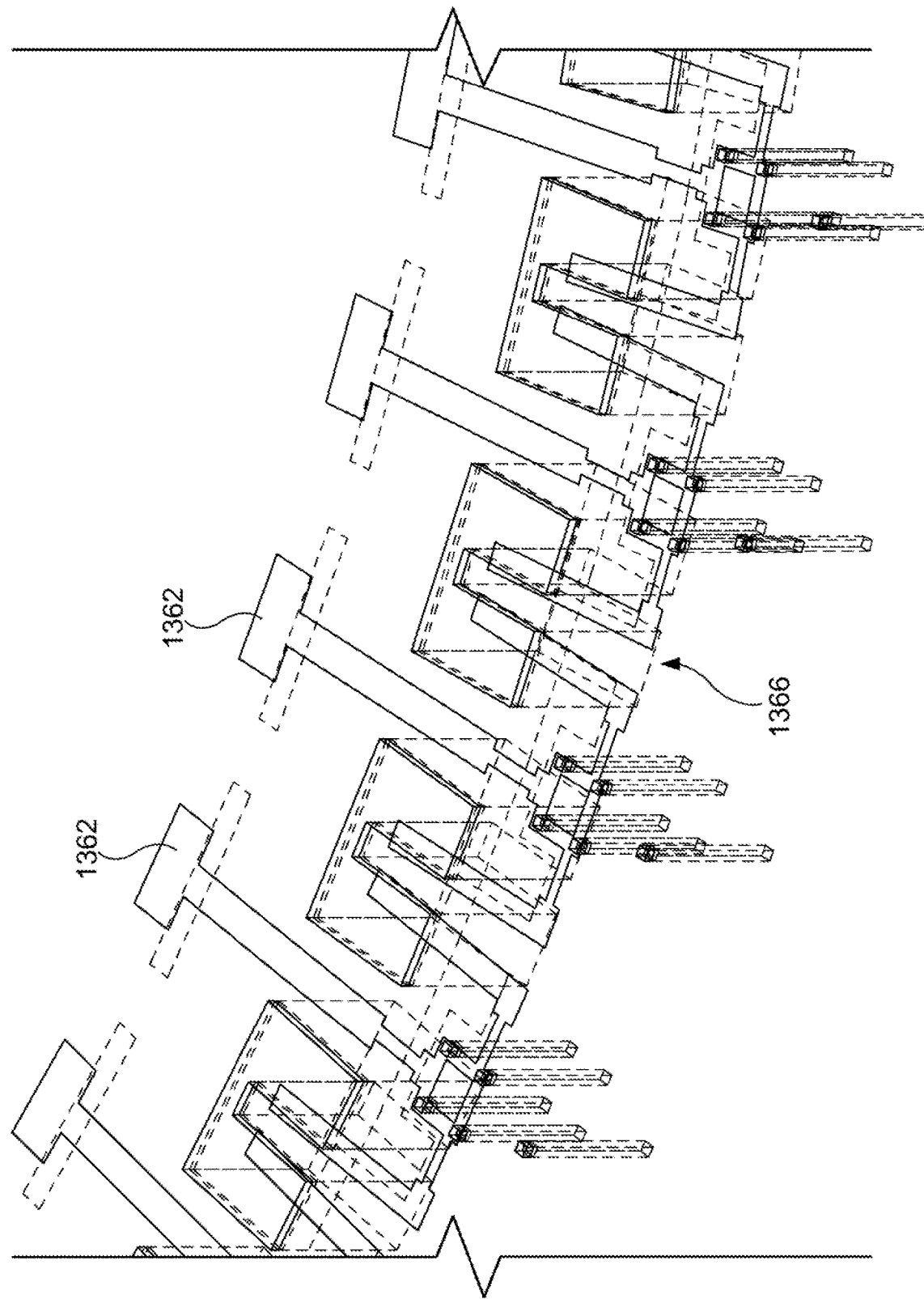
FIG. 13C schematically depicts a perspective view of a portion of the switchable lens antenna of FIG. 13A.

FIGS. 13A, 13B, and 13C depict different views of switchable lens antenna 1300 with transitions to vertically polarized radiators 1380, in accordance with various embodiments of the present disclosure. In this particular embodiment, switchable lens antenna 1300 has a phased array of 7 excitation ports 1312. The rows with frequency selective elements 100 have been previously discussed.

The illustrated embodiment of switchable lens antenna 1300 has microstrip lines 1362 located along circumference 104. The mictrostrip lines 1362 may improve transition the RF wave from the waveguide to another device. In FIG. 13A, 13B, 13C, microstrip lines 1362 are connected to modified inverted F antenna (IFA) 1366 that uses vias as the radiating part of the IFA.

Figure 14:
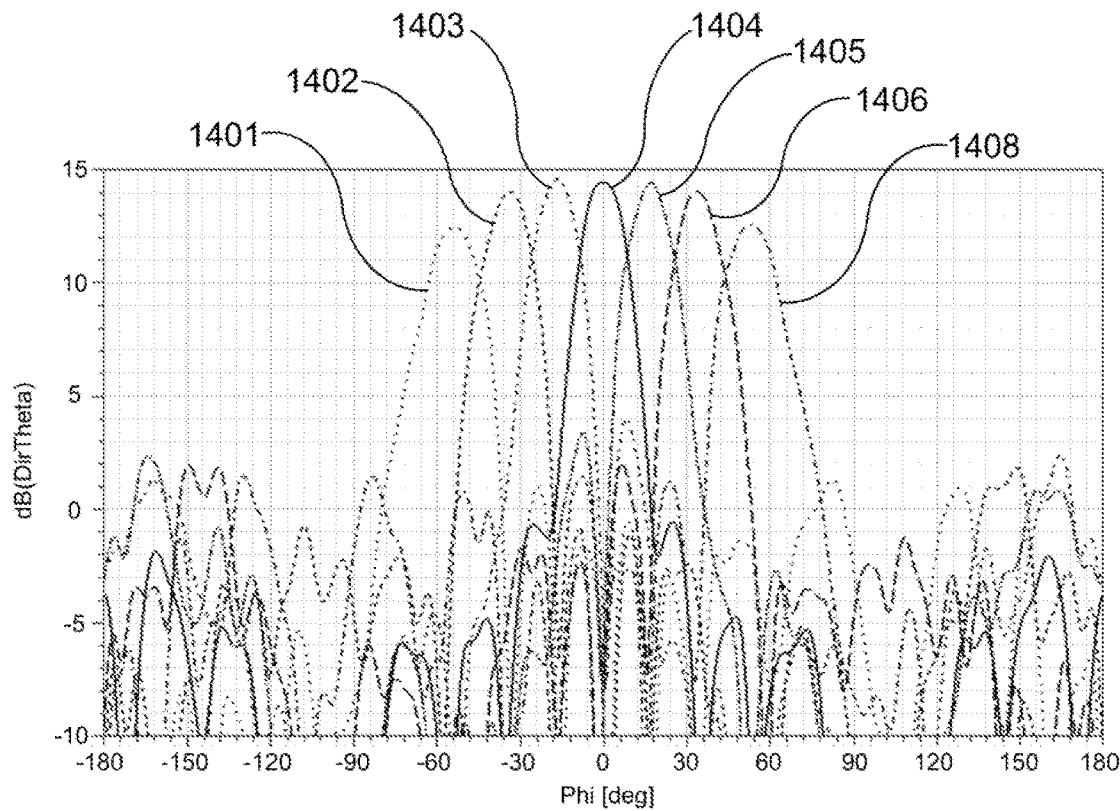
FIG. 14 depicts results of simulation of azimuth beam steering patterns of the switchable lens antenna, in accordance with various embodiments of the present disclosure.

FIG. 14 depicts results of simulation of azimuth beam steering patterns 1401, 1402, 1403, 1404, 1405, 1406, 1407, in Cartesian coordinates of switchable lens antenna 1300, in accordance with one of the embodiments of the present technology. The directivity of switchable lens antenna 1300 is plotted as a function of angle Phi 280. The steering angles θ of the patterns 1401, 1402, 1403, 1404, 1405, 1406, 1407 were between about −56° and about +56° and the RF wave was transmitted at 28 GHz.

Figure 15:
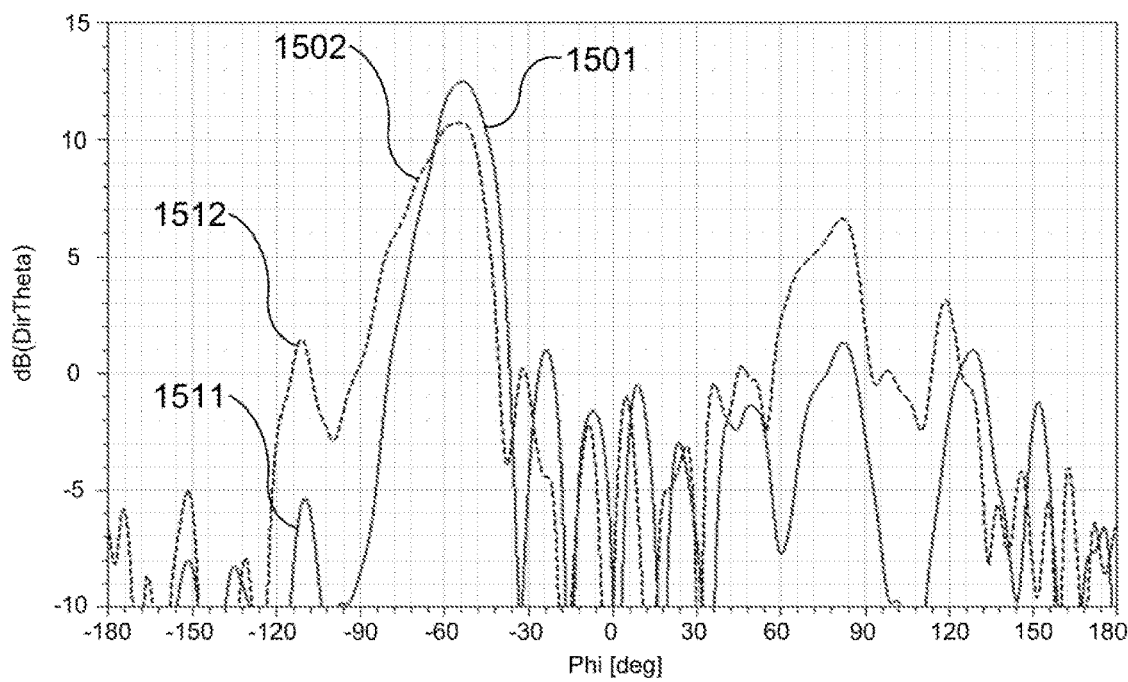
FIG. 15 depicts results of simulation of azimuth radiation patterns of the antenna with and without frequency selective structure.

FIG. 15 depicts results of simulation of azimuth radiation patterns in Cartesian coordinates of switchable lens antenna 1300 and of an antenna without FSS (i.e. an antenna having similar parallel-plate waveguide structure with similar excitation ports, but without FSS). A solid line 1501 depicts directivity of switchable lens antenna 1300 and a dashed line 1502 depicts directivity of the antenna without FSS. For both structures, with or without the switchable lens antenna, the beam was steered at −56°.

The simulations demonstrated the improved performance of the switchable lens antenna 1300 compared to performance of the antenna without FSS. As can be seen in FIG. 15, directivity 1501 of switchable lens antenna 1300 increased at around the steering angle of −56° compared to directivity 1502 of the antenna without FSS. The side lobes 1511 of switchable lens antenna 1300 decreased around the steering angle of −56° compared to side lobes 1512 of the antenna without FSS. In switchable lens antenna 1300, the directivity within 3 dB band width may cover a large angular range (±54°) in azimuth. In the antenna without the FSS, the directivity may decrease much faster with the increase in steering angle, and the angular range may be smaller compared to directivity and angular range of switchable lens antenna 1300.

Figure 16:
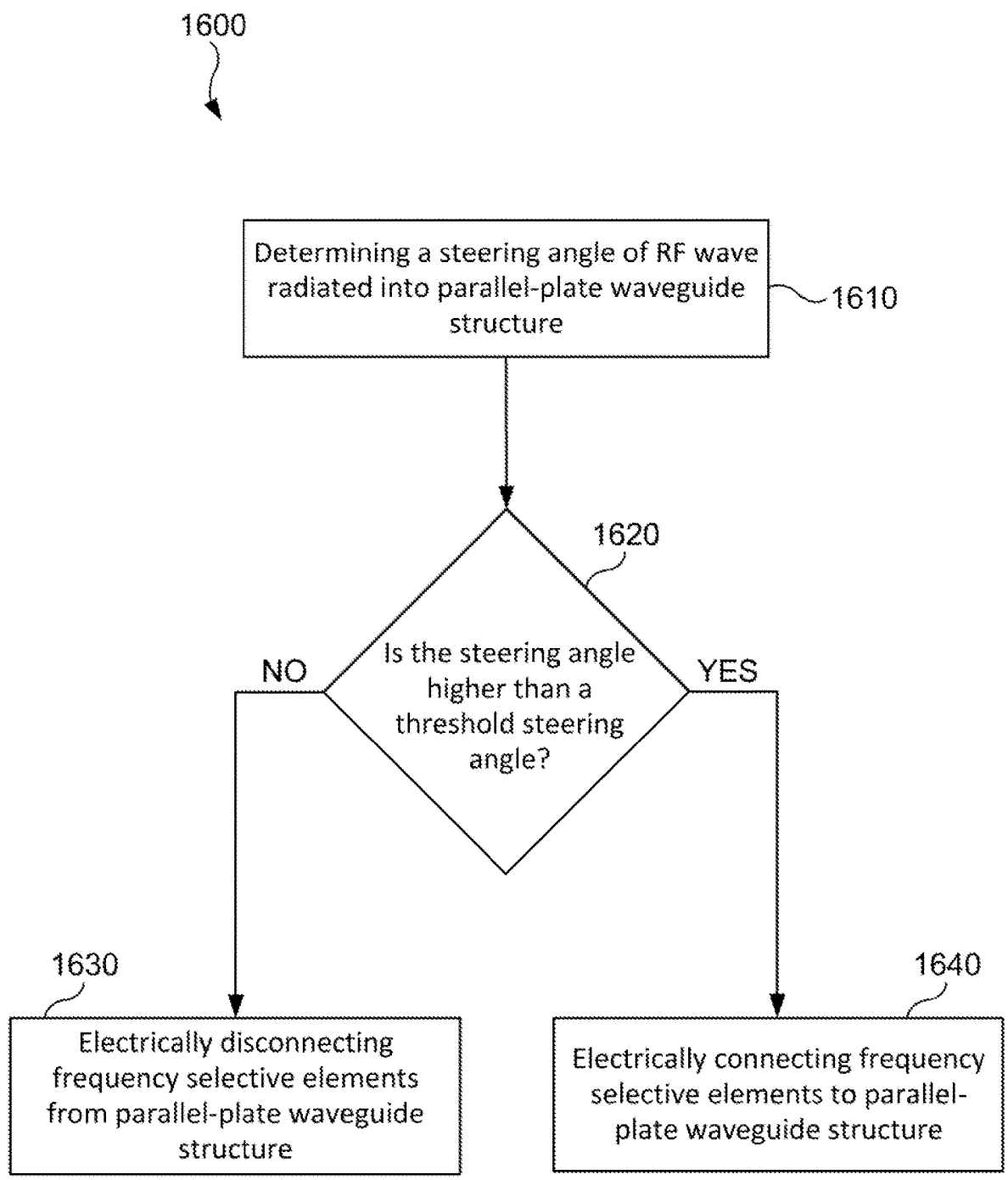
FIG. 16 illustrates a method for wireless communication, in accordance with various embodiments of the present disclosure.

FIG. 16 illustrates an example of a method 1600 for wireless communication, in accordance with various embodiments of the present disclosure. The method 1600 includes determining 1610 the steering angle of the RF wave radiated into parallel-plate waveguide structure 101. The steering angle is then compared 1620 to the threshold steering angle. If the steering angle is lower than the threshold steering angle, FSE 110 are electrically disconnected 1630 from parallel-plate waveguide structure 101. If the steering angle is higher than the threshold steering angle, FSE 110 are electrically connected 1640 to parallel-plate waveguide structure 101 to introduce the phase variance to RF wave propagating in parallel-plate waveguide structure 101. As discussed above, electrically connecting FSE 110 to and from the parallel-plate waveguide structure 101 may be done by electrically connecting and disconnecting stub 422 to and from ground surface 507 of parallel-plate waveguide structure 101 by switchable element 420.

The method 1600 may further include vertically polarizing the RF wave at an output of parallel-plate waveguide structure 101 with vertically polarized radiators 1380 by operating vertically polarized radiators 1380 with controller 480. For example, controller 480 may operate modified IFA 1366.

Two or more switchable lens antennas 100, 300, 1300 may be stacked one on top of each other. Such stacked antenna (not shown) may improve steering both in a plane coinciding with the plane of one switchable lens antenna 100, 300 and in planes perpendicular to the plane coinciding with the plane of one switchable lens antenna 100, 300, 1300.

Stacking of switchable lens antennas 100, 300, 1300 may be implemented by having a spacer between ground surface 507 of parallel-plate waveguide structure 101 of a first switchable lens antenna and a top surface 508 of the parallel-plate waveguide structure of a second switchable lens antenna to accommodate FSS 190 of the second switchable lens antenna. One controller may control steering of the RF wave in all stacked switchable lens antennas.

Two switchable lens antennas 100, 300, 1300 may also share the same ground surface 507. In such configuration, one switchable lens antenna 100, 300, 1300 may be a mirror image of another switchable lens antenna 100, 300, 1300, the parallel-plate waveguide structures of which share the same ground surface 507. Such mirror-image antenna may be implemented in one PCB.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A switchable lens antenna for transmission of a radio-frequency (RF) wave, the antenna comprising:
   a parallel-plate waveguide structure;
   excitation ports operable to radiate the RF wave into the parallel-plate waveguide structure in an initial steering angle; and
   a frequency selective structure having frequency selective elements, each frequency selective element comprising:
   a stub configured to introduce a phase variance to modify the steering angle of the RF wave when the stub is electrically connected to the parallel-plate waveguide structure; and
   a switchable element operatively connected to the stub and the parallel-plate waveguide structure, the switchable element configured to selectively electrically disconnect the stub from the parallel-plate waveguide structure when the antenna is in a first operational mode and to electrically connect the stub to the parallel-plate waveguide structure when the antenna is in a second operational mode.

2. The switchable lens antenna of claim 1, wherein:
   the antenna is in the first operational mode in response to the initial steering angle of the RF wave radiated by the excitation ports being about or less than a threshold steering angle, and
   the antenna is in the second operational mode in response to the initial steering angle of the RF wave radiated by the excitation ports being higher than the threshold steering angle.

3. The switchable lens antenna of claim 2, wherein the threshold steering angle is approximately a half of a half-power beam width of the RF wave radiated by the excitation ports at a boresight when the antenna is in the first operational mode.

4. The switchable lens antenna of claim 1, further comprising a controller configured to:
   determine operational mode of the antenna, the operational mode being one of the first operational mode and the second operational mode; and
   operate the switchable element to selectively electrically disconnect the stub from the parallel-plate waveguide structure when the antenna is in a first operational mode and to electrically connect the stub to the parallel-plate waveguide structure when the antenna is in the second operational mode.

5. The switchable lens antenna of claim 1, wherein the frequency selective elements comprise a first frequency selective element having a first stub and a second frequency selective element having a second stub, and the second frequency selective element is located further away from a boresight of the antenna and the second stub is longer than the first stub.

6. The switchable lens antenna of claim 1, wherein the frequency selective element is electrically connected to the parallel-plate waveguide structure through a via electrically connected to a ground surface of the parallel-plate waveguide structure.

7. The switchable lens antenna of claim 1, wherein the switchable element is a diode.

8. The switchable lens antenna of claim 1, further comprising vertically polarized radiators located at an output of the parallel-plate waveguide structure and configured to vertically polarize the RF wave.

9. The switchable lens antenna of claim 1, wherein the parallel-plate waveguide structure is a printed circuit board.

10. The switchable lens antenna of claim 1, wherein the frequency selective elements are positioned in at least one frequency selective structure row, each frequency selective element in the frequency selective structure row being located radially at about equal distance from a geometrical center of the excitation ports and a distance between neighbouring frequency selective elements in each frequency selective structure row is approximately the same.

11. A frequency selective structure for a lens-based antenna, the lens-based antenna having a parallel-plate waveguide structure and excitation ports operable to radiate a radio-frequency (RF) wave into the parallel-plate waveguide structure in an initial steering angle, the frequency selective structure comprising:
    a frequency selective element having:
    a stub configured to introduce a phase variance to modify the steering angle of the RF wave when electrically connected to the parallel-plate waveguide structure; and
    a switchable element operatively connected to the stub and to the parallel-plate waveguide structure, the switchable element configured to selectively electrically disconnect the stub from the parallel-plate waveguide structure when the antenna is in a first operational mode and to electrically connect the stub to the parallel-plate waveguide structure when the antenna is in a second operational mode.

12. The frequency-selective structure of claim 11, wherein the switchable element is a diode.

13. A method for wireless communication, the method comprising:
    determining an initial steering angle of a radio-frequency (RF) wave radiated into a parallel-plate waveguide structure;
    in response to the initial steering angle being about or lower than a threshold steering angle, electrically disconnecting frequency selective elements from the parallel-plate waveguide structure; and
    in response to the initial steering angle being higher than the threshold steering angle, electrically connecting the frequency selective elements to the parallel-plate waveguide structure to introduce a phase variance to modify the steering angle of the RF wave propagating in the parallel-plate waveguide structure;
    wherein the frequency selective elements are located in at least one frequency selective structure row, each frequency selective structure row being approximately equally distant from a geometrical center of excitation ports radiating the RF wave into the parallel-plate waveguide structure.

14. The method of claim 13, wherein the threshold steering angle is approximately a half of a half-power beam width of the RF wave.

15. The method of claim 13, wherein a distance between neighbouring frequency selective elements in each frequency selective structure row is approximately the same.

16. The method of claim 13, further comprising vertically polarizing the RF wave at an output of the parallel-plate waveguide structure with vertically polarized radiators.

17. The method of claim 13, wherein electrically connecting the frequency selective elements to and from the parallel-plate waveguide structure is done by electrically connecting and disconnecting a stub to and from a ground surface of the parallel-plate waveguide structure by a switchable element.

\* \* \* \* \*